(No Model.) 4 Sheets—Sheet 1.
D. S. FISHER.
COMBINED LOADER AND PRESS.
No. 456,484. Patented July 21, 1891.
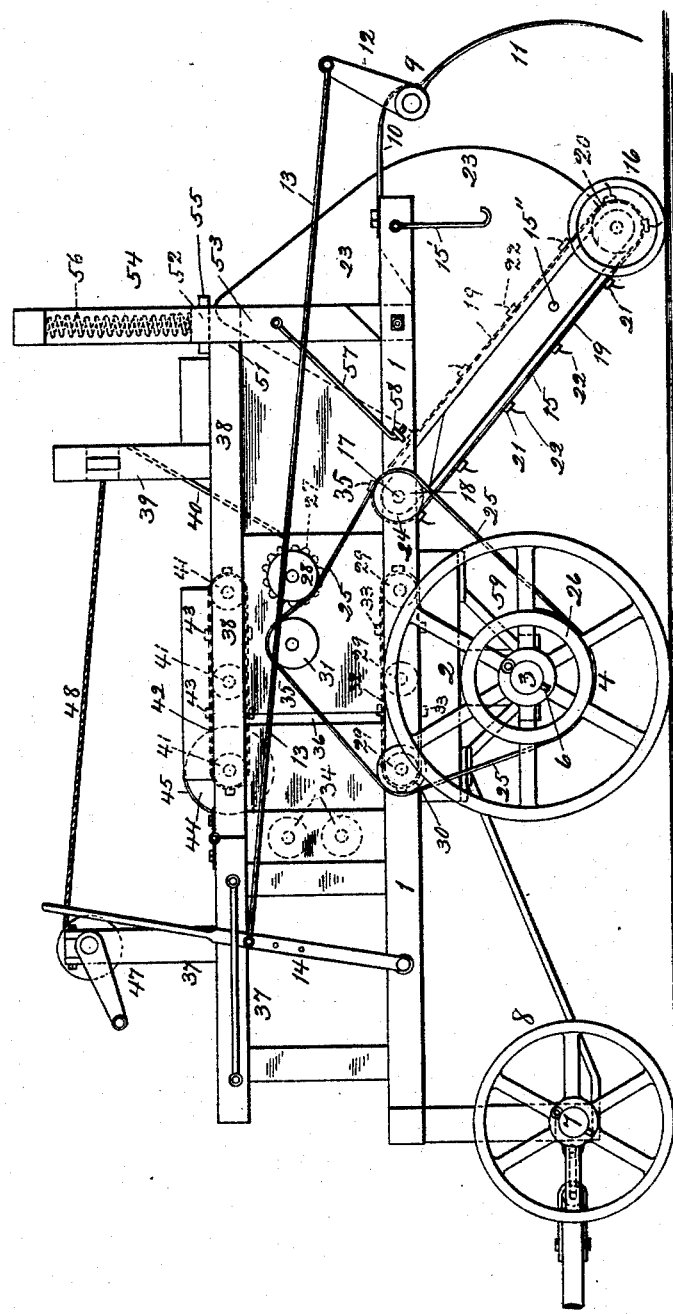
Fig. I.
Witnesses
J. G. Loper
W. E. Allen
Inventor
David S. Fisher
By his Attorneys
Knight Bros.

(No Model.) 4 Sheets—Sheet 2.
D. S. FISHER.
COMBINED LOADER AND PRESS.
No. 456,484. Patented July 21, 1891.
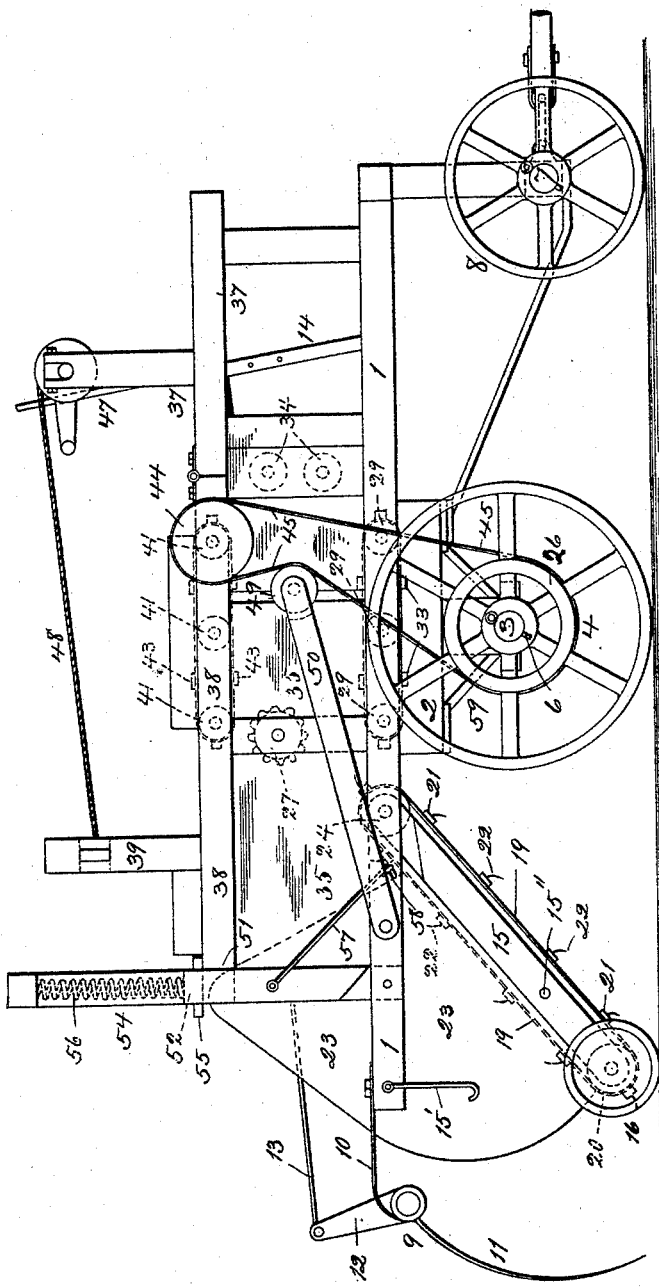
Fig. II.
Witnesses
J. G. Lepper.
W. E. Allen.
Inventor
David S. Fisher.
By his Attorneys
Knight Bros (No Model.) 4 Sheets—Sheet 3.
D. S. FISHER.
COMBINED LOADER AND PRESS.
No. 456,484. Patented July 21, 1891.
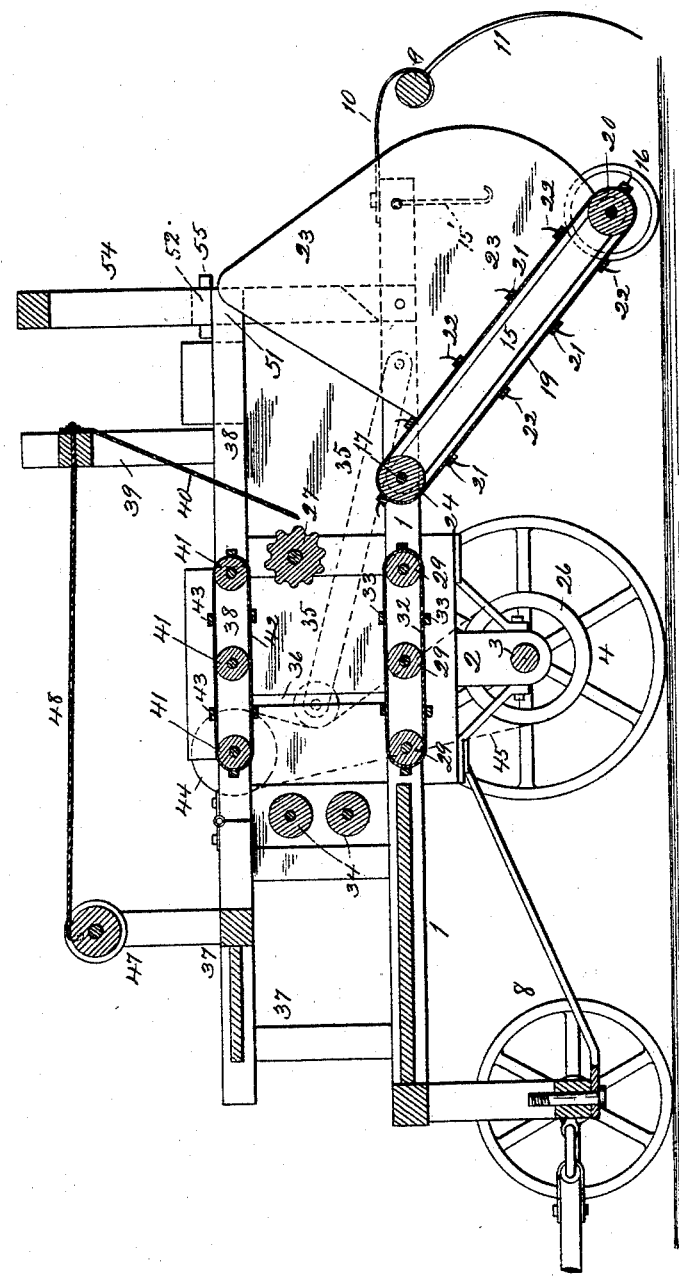
Fig. III.
Witnesses
J. G. Lepper.
W. E. Allen.
Inventor
David S. Fisher.
By his Attorneys
Knights Bros.

(No Model.) 4 Sheets—Sheet 4.
D. S. FISHER.
COMBINED LOADER AND PRESS.
No. 456,484. Patented July 21, 1891.
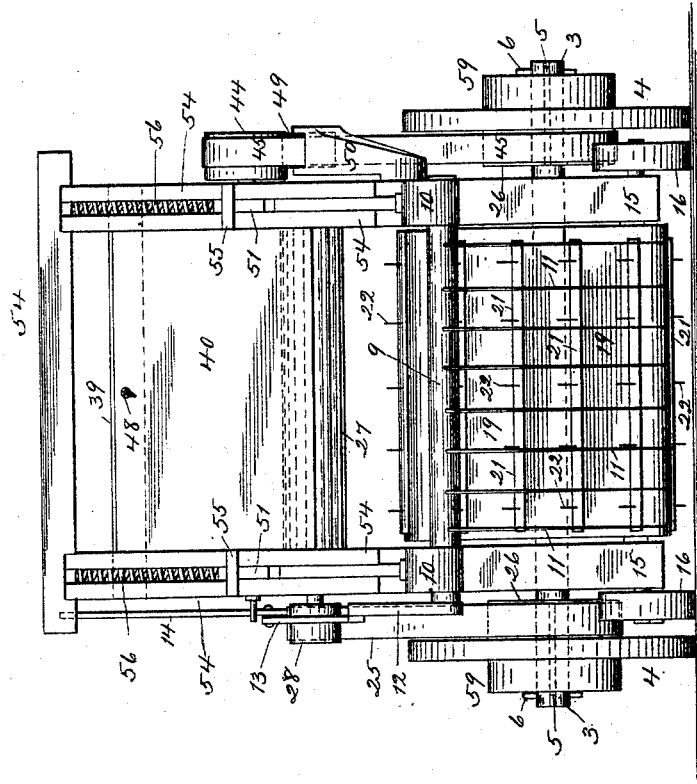
Fig. IV.
Witnesses
J. G. Pepper.
W. E. Allen.
Inventor
David S. Fisher
By his Attorneys
Knight Bros.

UNITED STATES PATENT OFFICE.

DAVID S. FISHER, OF VALLEY CITY, INDIANA.

COMBINED LOADER AND PRESS.

SPECIFICATION forming part of Letters Patent No. 456,484, dated July 21, 1891.

Application filed July 2, 1890. Serial No. 357,505. (No model.)

*To all whom it may concern:*

Be it known that I, DAVID S. FISHER, a citizen of the United States, and a resident of Valley City, in the county of Harrison and State of Indiana, have invented Improvements in a Combined Rake and Baling-Press, of which the following is a specification.

My invention relates to combined rakes and baling-presses; and it consists in the improved construction and arrangement or combination of parts hereinafter fully disclosed in the description, drawings, and claims.

In order that my invention may be fully understood, I will proceed to describe it with reference to the accompanying drawings, in which—

Figure I represents a side elevation of my improved combined rake and baling-press; Fig. II, a side elevation of the opposite side of the same; Fig. III, a longitudinal vertical section, and Fig. IV a rear view.

In the drawings, the numeral 1 indicates the bed-frame of the machine, which is provided with transverse bearings 2 for the rear axle or drive-shaft 3, upon the ends of which the drive-wheels 4 are secured by keys 5 (see Fig. IV) or other suitable means and by linchpins 6. The front axle 7 is pivoted in any suitable manner under the front end of the bed-frame and has the front wheels 8 journaled upon its ends. A rake-head 9 is journaled with its ends in the free ends of two flat springs 10, secured to the ends of the sills of the bed-frame, and has spring-teeth 11, and an arm 12 is secured to one end of said rakehead and has a rod 13 pivoted to it. The forward end of said rod is pivoted to a handlever 14, which is fulcrumed upon the forward end of the frame, and the rake may have its teeth tilted into contact with the ground for raking or out of contact with the ground by said lever and rod.

A frame 15 is hinged below the rear end of the bed-frame with its forward upper ends and has wheels or rollers 16 at its rear end, with which wheels or rollers it may travel over the ground and follow all inequalities of the same. The shaft 17 of a roller 18 is journaled in the sills of the bed-frame and has said frame hinged or pivoted upon it, and an endless apron 19 travels over said roller and over a roller 20, journaled in the lower rear end of said hinged frame 15. Said endless apron 19 has cross-slats 21, upon which are secured flexible spring-teeth 22. Upright sheet-metal side pieces 23 are secured to the sides of said hinged frame 15 and fit within the sills of the bed-frame. A sprocket wheel or pulley 24 is secured upon the end of said shaft 17 and has a chain or belt 25 passed over it, which passes under a sprocket wheel or pulley 26 upon one of the drive-wheels. Hooks 15' are pivoted upon the rear ends of the sills of the bed-frame and may engage studs 15'' upon the rear or lower ends of the side pieces of said frame 15 when the latter is raised above the ground for transportation of the machine from one place to another. A fluted or ribbed roller 27 to partially compress the material before passing into the baling-chamber is journaled in the frame above and slightly forward of said shaft 17 and roller 18 and has a sprocket wheel or pulley 28 upon the end of its shaft, which wheel or pulley is engaged from the under side by said chain or belt 25.

Three rollers 29 (or more, if necessary) are transversely journaled in the bed-frame above the drive-shaft, and the shaft of the forward roller is provided with a sprocket wheel or pulley 30, around which the chain or belt 25 passes, driving said roller. A sprocket wheel or pulley 31 is journaled upon the side of the machine-frame and serves as an idler or guide wheel or pulley for said chain or belt. An endless apron 32, having cross-slats 33, passes around said rollers 29 and forms the lower apron of the press. Two or more rollers 34 are transversely journaled in a vertical plane at the forward end of said apron 32 and form the forward end of the press-body.

Side pieces 35 are secured to the sills of the bed-frame and form the sides of the press-body, and said sides are formed with vertical (or transverse, if preferred) slots 36, through which the wires or other ties used for the bale may be inserted.

A platform or top frame 37 is supported from the forward end of the bed-frame forward of the series of rollers 34, and a cover-frame 38 is hinged to the rear end of said platform or top frame and has an upright frame 39 near its rear open end. An inclined plate 40 is secured in said upright frame 39 of the hinged frame 38 and is inclined forward or inward. Three rollers (or more, if necessary) 41 are journaled transversely in said hinged frame and have an endless apron 42, provided with cross-slats 43, passed around them. One of said rollers has a sprocket wheel or pulley 44 upon the end of its shaft and a belt or chain 45, which, passing under a sprocket wheel or pulley 46 upon the drive-wheel, passes over said wheel or pulley 44, driving said endless apron. A windlass 47 is journaled upon the top frame or platform 37 and has a rope or chain 48 wound upon it and secured to the upright portion 39 of the hinged frame 38, so that said frame may be raised and tilted forward by said windlass.

It will be seen that the press-body consists of the bed-frame 1, the sides 35, the top frame or platform 37, and the hinge or cover-frame 38, and provides in its middle portion a baling-chamber within which the material is passed and manipulated by certain means to form a bale.

An idler-pulley 49 is journaled in the outer end of an arm 50, which is pivoted upon the side of the bed-frame near the rear end of the same and serves to take up slack in the belt or chain 45, which is sufficiently slack to allow the hinged frame to be raised a short distance.

The ends of the side pieces 51 of the hinged frame 38 are preferably reduced and may slide in vertical slots 52 in the side pieces 53 of a rectangular frame 54, which is pivoted with the ends of its side pieces upon the rear portion of the bed-frame. Blocks 55 slide in said vertical slots and may bear against the reduced ends of said hinged frame, having springs 56 of considerable strength bearing down upon them, said springs being confined in said slots. Hooks 57 are pivoted to the side pieces 53 of said pivoted or hinged frame 54 and may engage staples 58 upon the side sills of the bed-frame when said hinged frame 54 is in its upright position, with the springs bearing against the ends of the side pieces of the upper hinged press-frame 38.

The drive-wheels are preferably provided with enlarged hubs or pulleys 59 upon the hubs for applying power to said drive-wheels when the press is used stationary.

In practice the machine is drawn by suitable power over the field in the same manner as a common horse hay-rake or hay-loader, and the cut hay will be raked up by the rake upon the traveling apron. Said apron, the spring-teeth of which assist in raking up the hay, will convey the hay in a continuous sheet to the lower apron of the press, which will carry it forward toward the forward rollers 34, where said sheet, which in the meantime has been slightly rolled by the rearwardly-traveling upper apron of the press, will be turned back and up against said upper apron. The two aprons of the press and the rollers for said aprons will roll the hay fed into the press into a round bale, one layer being wrapped around the other as the conveyer-apron feeds the hay to the press. The springs 56 will keep the upper hinged frame of the press with its rollers and apron down against the bale and will at the same time admit of said frame being lifted as the bale increases in size. The upper rollers will be driven by the drive-chain 45, which has a sufficient slack to admit of the frame 38 being lifted and will yet be held sufficiently tight by the idler-pulley 49 and its arm 50. For the purpose of keeping the bale rolled tightly against the front rollers and not thrown out the upper apron travels at a less speed rearward than the lower apron of the press travels forward, and this is accomplished by making the pulley or wheel 44 upon the roller-shaft of a larger diameter than the pulley or wheel 30 upon the lower roller-shaft, the drive-wheels traveling at the same speed, as they are keyed to the drive-shaft or axle. When a bale is finished, the hooks 57 are unhooked, the upright hinged frame 54 is tilted rearward, and the hinged frame 38 is raised by means of the windlass, the bale having before raising and releasing said frame been preliminarily tied by wires or other ties inserted through the vertical or transverse or both slots 36 in the sides of the press-body. The bale may now be rolled out of the press-body, the cover-frame again lowered and secured, and the raking and baling be resumed.

When the press is employed stationary, the rear end of the bed-frame is suitably propped up, so as to clear the drive-wheels from the ground. The rake may be either removed or tilted up and a belt applied to one of the pulleys or enlarged hubs of the drive-wheels, when the baling may be proceeded with in the same manner as when the press is used traveling in the field.

When the press is transported from one place to another, the rake is raised, the conveyer-frame raised and supported by its hooks, and the keys which secure the wheels upon the drive-shaft or axle are removed, the linchpins being removed first to allow access to said keys. The drive-wheels may now revolve freely upon the ends of the axle and the machine may be drawn as a wagon or other vehicle without unnecessarily wearing the operating parts by running them without material to operate upon.

Having thus fully described the construction and arrangement or combination of the several parts of my improved baling-press, its operation, and advantages, what I claim as new is—

1. The combination, with a press-body having a baling-chamber and suitable ends, of the lower rollers having an endless apron mounted thereon, the upper rollers having an endless apron mounted thereon, and mechanism by which the aprons are caused to travel in opposite directions, substantially as described.

2. The combination, with a press-body having a baling-chamber and suitable ends, of the lower rollers having an endless apron mounted thereon, the upper rollers having an endless apron mounted thereon, and mechanism by which the aprons are caused to travel in opposite directions and at unequal speed, substantially as described.

3. The combination, with a press-body having a baling-chamber and suitable ends, of the lower rollers having an endless apron mounted thereon, the upper rollers having an endless apron mounted thereon, mechanism by which the lower apron is caused to travel in one direction, and mechanism by which the upper apron is caused to travel in the opposite direction at a less speed than the lower apron, substantially as described.

4. The combination, with a press-body having a baling-chamber and suitable outer end, of the lower rollers having an endless apron mounted thereon, the upper rollers having an endless apron mounted thereon, mechanism by which the aprons are caused to travel in opposite directions, and a series of rollers between the inner ends of said aprons, substantially as described.

5. The combination, with a press-body having a baling-chamber, of the lower rollers having an endless apron mounted thereon, the upper rollers having an endless apron mounted thereon, mechanism by which the aprons are caused to travel in opposite directions, a series of rollers between the inner ends of said aprons, and a roller to partly compress the material between the outer ends of the aprons, substantially as described.

6. The combination, with a press-body having a baling-chamber and suitable ends, of the lower rollers having an endless apron mounted thereon, a yielding cover-frame, the upper rollers journaled in the yielding cover-frame and having an endless apron mounted thereon, and mechanism by which the aprons are caused to travel in opposite directions, substantially as described.

7. The combination, with a press-body having a baling-chamber and suitable ends, of the lower rollers having an endless apron mounted thereon, a yielding cover-frame, the upper rollers journaled in the yielding cover-frame and having an endless apron mounted thereon, and mechanism by which the aprons are caused to travel in opposite directions and at unequal speed, substantially as described.

8. The combination, with a press-body having a baling-chamber and suitable ends, of the lower rollers having an endless apron mounted thereon, a yielding cover-frame, the upper rollers journaled in the yielding cover-frame and having an endless apron mounted thereon, mechanism by which the lower apron is caused to travel in one direction, and mechanism by which the upper apron is caused to travel in the opposite direction at a less speed than the lower apron, substantially as described.

9. The combination, with a press-body having a baling-chamber and suitable outer end, of the lower rollers having an endless apron mounted thereon, a yielding cover-frame, the upper rollers journaled in the yielding cover-frame and having an endless apron mounted thereon, mechanism by which the aprons are caused to travel in opposite directions, and a series of rollers between the inner ends of said aprons, substantially as described.

10. The combination, with a press-body having a baling-chamber, of the lower rollers having an endless apron mounted thereon, a yielding cover-frame, the upper rollers journaled in the yielding cover-frame and having an endless apron mounted thereon, mechanism by which the aprons are caused to travel in opposite directions, a series of rollers between the inner ends of said aprons, and a roller between the outer ends of the aprons to partly compress the material, substantially as described.

11. The combination of the bed-frame, rollers journaled to the bed-frame, means for rotating one of the rollers, an endless apron mounted on the rollers, the body sides, suitable ends, the platform, the cover-frame hinged to the platform, rollers journaled to the cover-frame, means for rotating one of the rollers of the cover-frame, an endless apron mounted on the rollers of the cover-frame, the vertical frame hinged to the rear end of the bed-frame, having side pieces formed with longitudinal slots receiving the ends of the cover-frame, and the springs within the slots of the vertical frame, bearing on the ends of the cover-frame, substantially as described.

12. The combination of the bed-frame, rollers journaled to the bed-frame, means for rotating one of the rollers, an endless apron mounted on the rollers, the body sides, suitable ends, the platform, the cover-frame hinged to the platform, rollers journaled to the cover-frame, means for rotating one of the rollers of the cover-frame, an endless apron mounted on the rollers of the cover-frame, the vertical frame hinged to the rear end of the bed-frame, having side pieces formed with longitudinal slots receiving the ends of the cover-frame, the blocks sliding in the slots of the vertical frame, and the springs within the slots of the vertical frame, bearing against the blocks of the vertical frame, substantially as described.

13. The combination, with a press-body having a baling-chamber and suitable ends, of the lower rollers having an endless apron mounted thereon, the upper rollers having an endless apron mounted thereon, mechanism by which the aprons are caused to travel in opposite directions, the feeder-frame below the rear end of the press-body, rollers journaled in the feeder-frame, having an endless apron mounted thereon, and mechanism by which the feeder-apron is caused to travel in the same direction as the lower apron, substantially as described.

14. The combination of the press-body having slots for the insertion of the baleties and a baling-chamber, the lower rollers having an endless apron mounted thereon, the upper rollers having an endless apron mounted thereon, the rollers between the inner ends of the endless aprons, and a compressing-roller between the outer ends of the endless aprons, substantially as described.

DAVID S. FISHER.

Witnesses:
FRANCIS M. HARDIN,
THEO. CLAY FOSTER.